(12) United States Patent
Kim

(10) Patent No.: US 12,236,711 B2
(45) Date of Patent: Feb. 25, 2025

(54) APPARATUS AND METHOD FOR PROVIDING MISSING CHILD SEARCH SERVICE BASED ON FACE RECOGNITION USING DEEP-LEARNING

(71) Applicant: OneMoreSecurity Inc., Sejong (KR)

(72) Inventor: Min-Sik Kim, Sejong (KR)

(73) Assignee: OneMoreSecurity Inc., Sejong (KR)

( * ) Notice: Subject to any disclaimer, the term of this patent is extended or adjusted under 35 U.S.C. 154(b) by 465 days.

(21) Appl. No.: 17/606,590

(22) PCT Filed: Aug. 10, 2021

(86) PCT No.: PCT/KR2021/010589
§ 371 (c)(1),
(2) Date: Oct. 26, 2021

(87) PCT Pub. No.: WO2022/035190
PCT Pub. Date: Feb. 17, 2022

(65) Prior Publication Data
US 2022/0319232 A1  Oct. 6, 2022

(30) Foreign Application Priority Data

Aug. 11, 2020  (KR) ........................ 10-2020-0100700
Oct. 5, 2020   (KR) ........................ 10-2020-0127867
Feb. 19, 2021  (KR) ........................ 10-2021-0022739

(51) Int. Cl.
*G06V 40/16*   (2022.01)
*G06Q 50/22*   (2024.01)
(Continued)

(52) U.S. Cl.
CPC .......... *G06V 40/172* (2022.01); *G06Q 50/22* (2013.01); *G06Q 50/265* (2013.01); *G06T 7/246* (2017.01);
(Continued)

(58) Field of Classification Search
CPC .... G06V 40/172; G06V 20/52; G06V 40/161; G06V 40/50; G06Q 50/22; G06Q 50/265;
(Continued)

(56) References Cited

U.S. PATENT DOCUMENTS

2014/0337697 A1* 11/2014 Ryu ........................ H04L 51/52
709/204
2019/0065906 A1*  2/2019 Weng ................ G06F 18/24143
(Continued)

FOREIGN PATENT DOCUMENTS

KR   101215948 B1   12/2012
KR   101371662 B1    3/2014
(Continued)

*Primary Examiner* — Jianxun Yang
(74) *Attorney, Agent, or Firm* — Brooks, Cameron & Huebsch, PLLC

(57) ABSTRACT

Disclosed herein are an apparatus and method for providing a missing child search service based on face recognition using deep learning. The method according to an embodiment may include registering missing child occurrence information including a first missing child image and information about a location from which and a time at which a child went missing when occurrence of a missing child is reported by at least one first user terminal, registering missing child finding information including a second missing child image and information about a location and a time at which a missing child was found when finding of a missing child is reported by at least one second user terminal, calculating a similarity between pieces of facial feature information extracted from the first missing child image and the second missing child image, respectively, based on deep learning, and when the similarity is equal to or greater than a predetermined threshold value, delivering contact information of the second user terminal and the missing child finding information to the first user terminal, and delivering contact information of the first user terminal and the missing child occurrence information to the second user terminal.

12 Claims, 10 Drawing Sheets

(51) Int. Cl.
   *G06Q 50/26* (2024.01)
   *G06T 7/246* (2017.01)
   *G06V 20/52* (2022.01)
   *G06V 40/50* (2022.01)

(52) U.S. Cl.
   CPC ............ *G06V 20/52* (2022.01); *G06V 40/161* (2022.01); *G06V 40/50* (2022.01); *G06T 2207/30201* (2013.01); *G06T 2207/30232* (2013.01)

(58) Field of Classification Search
   CPC .................... G06Q 50/26; G06T 7/246; G06T 2207/30201; G06T 2207/30232; G06T 7/20; H04N 7/18; G06F 18/00
   See application file for complete search history.

(56) References Cited

U.S. PATENT DOCUMENTS

2019/0318076 A1* 10/2019 Chun .................... H04L 67/131
2021/0019345 A1*  1/2021 Kim .................... G06F 16/5854

FOREIGN PATENT DOCUMENTS

| KR | 10-2016-0044858 A |   | 4/2016 |           |
|----|-------------------|---|--------|-----------|
| KR | 10-2018-0006016 A |   | 1/2018 |           |
| KR | 20190093799 A     | * | 1/2018 | ............... G06K 9/00 |
| KR | 20180092434 A1    |   | 8/2018 |           |
| KR | 10-2019-0041704 A |   | 4/2019 |           |
| KR | 10-2019-0093799 A |   | 8/2019 |           |
| KR | 20180006016 A     | * | 8/2019 | ............... G06K 9/00 |
| KR | 10-2020-0094444 A |   | 8/2020 |           |

\* cited by examiner

APPARATUS AND METHOD FOR PROVIDING MISSING CHILD SEARCH SERVICE BASED ON FACE RECOGNITION USING DEEP-LEARNING

TECHNICAL FIELD

The present invention relates to technology for searching for a missing child based on face recognition.

BACKGROUND ART

Korean Patent Application Publication No. 10-2018-0006016 (hereinafter referred to as a "prior art document") provides a missing child search service based on face recognition using a picture of a missing child.

However, in the prior art document, a typical image recognition technique is used, and thus a recognition error may occur due to various environmental changes, such as a capture posture, a capture distance, a change in a facial expression, and a change in the brightness of ambient light.

Further, there is required the development of technology that is capable of further shortening the time required to search for a missing child by effectively utilizing the so-called "golden hour".

Furthermore, since a child may be moved far away from the location at which the child went missing or at which a child presumed to be a missing child was found by a citizen, there is a need to promptly trace the movement path of the missing child.

In this case, in consideration of the fact that a kidnapper has a high likelihood of escaping with a missing child in a car when a missing child is abducted by a kidnapper, rather than merely losing his or her way, there is required the development of technology that is capable of tracing the movement path of the missing child.

DISCLOSURE

Technical Problem

An object of the present invention is to enable a missing child to be promptly found without error through a missing child search based on face recognition using robust deep learning despite various environmental changes, such as a capture posture, a capture distance, a change in facial expression, and a change in the brightness of ambient light.

Another object of the present invention is to promptly trace the movement path of a missing child.

A further object of the present invention is to promptly trace the movement path of a missing child in consideration of the fact that a kidnapper has a strong possibility of escaping with the missing child in a car when the child is abducted by the kidnapper.

Yet another object of the present invention is to allow missing child occurrence information to be intensively and effectively exposed to citizens located along the movement path of a missing child, thus further shortening the time required to find the missing child while preventing unnecessary information from being distributed.

Technical Solution

A method for providing a missing child search service based on face recognition using deep learning according to the present invention to accomplish the above objects includes registering missing child occurrence information including a first missing child image and information about a location from which and a time at which a child went missing when occurrence of a missing child is reported by at least one first user terminal, registering missing child finding information including a second missing child image and information about a location and a time at which a missing child was found when finding of the missing child is reported by at least one second user terminal, calculating a similarity between pieces of facial feature information extracted from the first missing child image and the second missing child image, respectively, based on deep learning, and when the similarity is equal to or greater than a predetermined threshold value, delivering contact information of the second user terminal and the missing child finding information to the first user terminal, and delivering contact information of the first user terminal and the missing child occurrence information to the second user terminal.

Further, the method for providing a missing child search service based on face recognition using deep learning according to an embodiment of the present invention may further include receiving a child image from the at least one first user terminal and pre-registering the child image before the child goes missing, wherein registering the missing child occurrence information is configured to, when occurrence of the missing child is reported by the first user terminal, registering the pre-registered child image as the first missing child image.

Furthermore, the method for providing a missing child search service based on face recognition using deep learning according to an embodiment of the present invention may further include receiving a child image from the first user terminal and pre-registering the child image before the child goes missing, and when occurrence of a missing child is not reported within a predetermined period of time after pre-registration of the child image, deleting the pre-registered child image.

Here, each of the child image and the first missing child image may be configured such that only an image in which a size of a face area is equal to or greater than a predetermined size is registered.

Here, the facial feature information may be acquired by detecting a face area from each of the first missing child image and the second missing child image, detecting feature points of a face from the detected face area through a three-dimensional (3D) model estimation scheme, normalizing the face area based on the detected feature points, and calculating a feature vector based on a convolutional neural network from the normalized face area.

Furthermore, the method for providing a missing child search service based on face recognition using deep learning according to an embodiment of the present invention may further include requesting an intelligent control center system to trace the missing child by transmitting the missing child occurrence information to the intelligent control center system, wherein the intelligent control center system comprises a missing child tracing server for operating in conjunction with multiple Closed Circuit Televisions (CCTVs) and signage displays, wherein the missing child tracing server may perform collecting CCTV images based on the information about the location from which and the time at which the child went missing, extracting image frames, each including at least one person, from the collected CCTV images, extracting feature information of an entire body of the missing child from an image frame presumed to include the missing child from among the image frames based on the first missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, tracing a movement path of the missing child based on time and location information of image frames included in the tracing group, and displaying the missing child occurrence information on digital signage devices located along the movement path of the missing child.

Furthermore, the method for providing a missing child search service based on face recognition using deep learning according to an embodiment of the present invention may further include generating a third missing child image that is corrected based on the first missing child image and the second missing child image, generating search information by aggregating the location from which and the time at which the child went missing and the location and the time at which the missing child was found, and requesting an intelligent control center system to trace the missing child by transmitting the third missing child image and the search information to the intelligent control center system, wherein the intelligent control center system may include a missing child tracing server for operating in conjunction with multiple Closed Circuit Televisions (CCTVs) and signage displays, wherein the missing child tracing server may perform collecting CCTV images based on a corrected missing child tracing location and time, extracting image frames, each including at least one person, from the collected CCTV images, extracting feature information of an entire body of the missing child from an image frame presumed to include the missing child from among the image frames based on the third missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, tracing a movement path of the missing child based on time and location information of image frames included in the tracing group, and displaying the missing child occurrence information on digital signage devices located along the movement path of the missing child.

An apparatus for providing a missing child search service based on face recognition using deep learning according to an embodiment of the present invention includes memory for storing at least one program, and a processor for executing the program, wherein the program may perform registering missing child occurrence information including a first missing child image and information about a location from which and a time at which a child went missing when occurrence of a missing child is reported by at least one first user terminal, registering missing child finding information including a second missing child image and information about a location and a time at which a missing child was found when finding of the missing child is reported by at least one second user terminal, calculating a similarity between pieces of facial feature information extracted from the first missing child image and the second missing child image, respectively, based on deep learning, and when the similarity is equal to or greater than a predetermined threshold value, delivering contact information of the second user terminal and the missing child finding information to the first user terminal, and delivering contact information of the first user terminal and the missing child occurrence information to the second user terminal.

Here, the program may further perform receiving a child image from the at least one first user terminal and pre-registering the child image before the child goes missing, and when occurrence of a missing child is not reported within a predetermined period of time after pre-registration of the child image, deleting the pre-registered child image, wherein registering the missing child occurrence information may be configured to, when occurrence of the missing child is reported by the first user terminal, register the pre-registered child image as the first missing child image.

Here, the facial feature information may be acquired by detecting a face area from each of the first missing child image and the second missing child image, detecting feature points of a face from the detected face area through a three-dimensional (3D) model estimation scheme, normalizing the face area based on the detected feature points, and calculating a feature vector based on a convolutional neural network from the normalized face area.

Here, the program may further perform requesting an intelligent control center system to trace the missing child by transmitting the missing child occurrence information to the intelligent control center system, wherein the intelligent control center system comprises a missing child tracing server for operating in conjunction with multiple CCTVs and signage displays, and wherein the missing child tracing server may perform collecting CCTV images based on the information about the location from which and the time at which the child went missing, extracting image frames, each including at least one person, from the collected CCTV images, extracting feature information of an entire body of the missing child from an image frame presumed to include the missing child from among the image frames based on the first missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, tracing a movement path of the missing child based on time and location information of image frames included in the tracing group, and displaying the missing child occurrence information on digital signage devices located along the movement path of the missing child.

Here, the program may further perform generating a third missing child image that is corrected based on the first missing child image and the second missing child image, generating search information by aggregating the location from which and the time at which the child went missing and the location and the time at which the missing child was found, and requesting an intelligent control center system to trace the missing child by transmitting the third missing child image and the search information to the intelligent control center system, wherein the intelligent control center system may include a missing child tracing server for operating in conjunction with multiple CCTVs and signage displays, and wherein the missing child tracing server may perform collecting CCTV images based on the search information, extracting image frames, each including at least one person, from the collected CCTV images, extracting feature information of an entire body of the missing child from an image frame presumed to include the missing child from among the image frames based on the third missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, tracing a movement path of the missing child based on time and location information of image frames included in the tracing group, and displaying the missing child occurrence information on digital signage devices located along the movement path of the missing child.

A method for tracing a movement path of a missing child based on deep learning, the method being performed by a missing child tracing server operating in conjunction with multiple CCTVs according to a further embodiment of the present invention may include, may include tracing a first movement path through comparative analysis of CCTV images, collected based on information about a location from which and a time at which a child went missing, and a missing child image, analyzing CCTV images, obtained by capturing the first movement path, and then determining whether there is a getaway car associated with kidnapping of the missing child, and if it is determined that there is a getaway car, tracing a second movement path through comparative analysis of CCTV images, collected based on the first movement path and an image of the getaway car.

Here, the missing child tracing server may be operated in conjunction with multiple signage displays, and the method may further include displaying the missing child occurrence information on a digital signage device located along at least one of the first movement path and the second movement path.

Here, tracing the first movement path may include collecting CCTV images based on the information about the location from which and the time at which the child went missing, extracting image frames, each including at least one person, from the collected CCTV images, extracting feature information of an entire body of the missing child from an image frame presumed to include the missing child from among the image frames based on the missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, and tracing the first movement path along which the missing child moves based on time and location information of image frames included in the tracing group.

Here, tracing the second movement path may be configured to perform extracting feature information of an entire getaway car from an image frame of the getaway car, extracting image frames, each including at least one car, from CCTV images collected based on the second movement path, extracting feature information of all cars included in the image frames and clustering the image frames into a predetermined number of groups based on the extracted feature information, selecting a tracing group from among the predetermined number of groups based on a similarity to the feature information of the getaway car, and tracing the second movement path along which the car moves based on time and location information of image frames included in the tracing group.

Here, tracing the first movement path may be performed in response to a missing child tracing request received together with missing child occurrence information from a missing child search service provision server, and the missing child search service provision server may perform registering missing child occurrence information including a first missing child image and the information about the location from which and the time at which the child went missing when occurrence of the missing child is reported by at least one first user terminal, and requesting tracing of the missing child using the registered missing child occurrence information including the first missing child image and the information about the location from which and the time at which the child went missing.

Here, tracing the first movement path may be performed in response to a missing child tracing request received together with missing child occurrence information from a missing child search service provision server, and the missing child search service provision server further may perform registering missing child occurrence information including a first missing child image and the information about the location from which and the time at which the child went missing when occurrence of the missing child is reported by at least one first user terminal, registering missing child finding information including a second missing child image and information about a location and a time at which a missing child was found when finding of a missing child is reported by at least one second user terminal, calculating a similarity between pieces of facial feature information extracted from the first missing child image and the second missing child image, respectively, based on deep learning, when the similarity is equal to or greater than a predetermined threshold value, generating a third missing child image that is corrected based on the first missing child image and the second missing child image, generating search information by aggregating the location from which and the time at which the child went missing and the location and the time at which the missing child was found, and requesting tracing of the missing child using missing child occurrence information including the third missing child image and the search information.

A missing child tracing server operating in conjunction with multiple CCTVs according to an embodiment of the present invention may include memory for storing at least one program and a processor for executing the program, wherein the program may perform tracing a first movement path through comparative analysis of CCTV images, collected based on information about a location from which and a time at which a child went missing, and a missing child image, analyzing CCTV images, obtained by capturing the first movement path, and then determining whether there is a getaway car associated with kidnapping of the missing child, and if it is determined that there is an image of the getaway car, tracing a second movement path through comparative analysis of the CCTV images, collected based on the first movement path, and the image of the getaway car.

Here, the missing child tracing server may be operated in conjunction with multiple signage displays, and may further perform displaying the missing child occurrence information on a digital signage device located along at least one of the first movement path and the second movement path.

Here, tracing the first movement path may include collecting CCTV images based on the information about the location from which and the time at which the child went missing, extracting image frames, each including at least one person, from the collected CCTV images, extracting feature information of an entire body of the missing child from an image frame presumed to include the missing child from among the image frames based on the missing child image, extracting feature information of entire bodies of all persons included in the image frames and clustering the image frames into a predetermined number of groups based on the extracted feature information, selecting a tracing group from among the predetermined number of groups based on a similarity to the feature information of the entire body of the missing child, and tracing the first movement path along which the missing child moves based on time and location information of image frames included in the tracing group.

Here, tracing the second movement path may be is configured to perform extracting feature information of an entire getaway car from an image frame of the getaway car, extracting image frames, each including at least one car, from CCTV images collected based on the second movement path, extracting feature information of all cars included in the image frames and clustering the image frames into a predetermined number of groups based on the extracted feature information, selecting a tracing group from among the predetermined number of groups based on a similarity to the feature information of the getaway car, and tracing the second movement path along which the car moves based on time and location information of image frames included in the tracing group.

Here, tracing the first movement path may be performed in response to a missing child tracing request received together with missing child occurrence information from a missing child search service provision server, and the missing child search service provision server may perform registering missing child occurrence information including a first missing child image and the information about the location from which and the time at which the child went missing when occurrence of the missing child is reported by at least one first user terminal, and requesting tracing of the missing child using the registered missing child occurrence information including the first missing child image and the information about the location from which and the time at which the child went missing.

Here, tracing the first movement path may be performed in response to a missing child tracing request received together with missing child occurrence information from a missing child search service provision server, and the missing child search service provision server may further perform registering missing child occurrence information including a first missing child image and the information about the location from which and the time at which the child went missing when occurrence of the missing child is reported by at least one first user terminal, registering missing child finding information including a second missing child image and information about a location and a time at which a missing child was found when finding of a missing child is reported by at least one second user terminal, calculating a similarity between pieces of facial feature information extracted from the first missing child image and the second missing child image, respectively, based on deep learning, when the similarity is equal to or greater than a predetermined threshold value, generating a third missing child image that is corrected based on the first missing child image and the second missing child image, generating search information by aggregating the location from which and the time at which the child went missing and the location and the time at which the missing child was found, and requesting tracing of the missing child using missing child occurrence information including the third missing child image and the search information.

Advantageous Effects

In accordance with the present invention, a missing child may be promptly found without error through a missing child search based on face recognition using robust deep learning despite various environmental changes, such as a capture posture, a capture distance, a change in facial expression, and a change in the brightness of ambient light.

Further, in accordance with the present invention, the movement path of a missing child may be promptly traced.

Furthermore, in accordance with the present invention, the movement path of a missing child may be promptly traced in consideration of the fact that a kidnapper has a strong possibility of escaping with the missing child in a car when the child is abducted by the kidnapper.

In addition, in accordance with the present invention, missing child occurrence information may be intensively and effectively exposed to citizens located along the movement path of a missing child, thus further shortening the time required to find the missing child while preventing unnecessary information from being distributed.

BEST MODE

Figure 1:
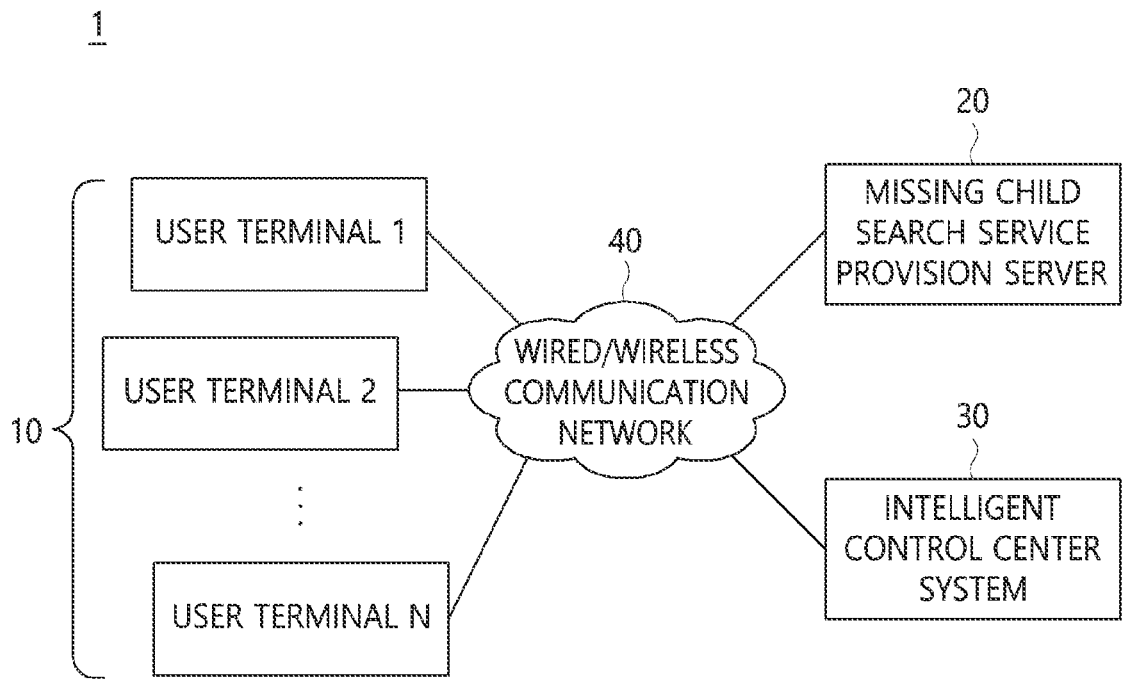
FIG. 1 is a configuration diagram of a system for providing a missing child search service based on deep learning according to an embodiment of the present invention.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and a method for providing a missing child search service based on face recognition using deep learning according to embodiments will be described in detail with reference to FIGS. 1 to 11.

Figure 2:
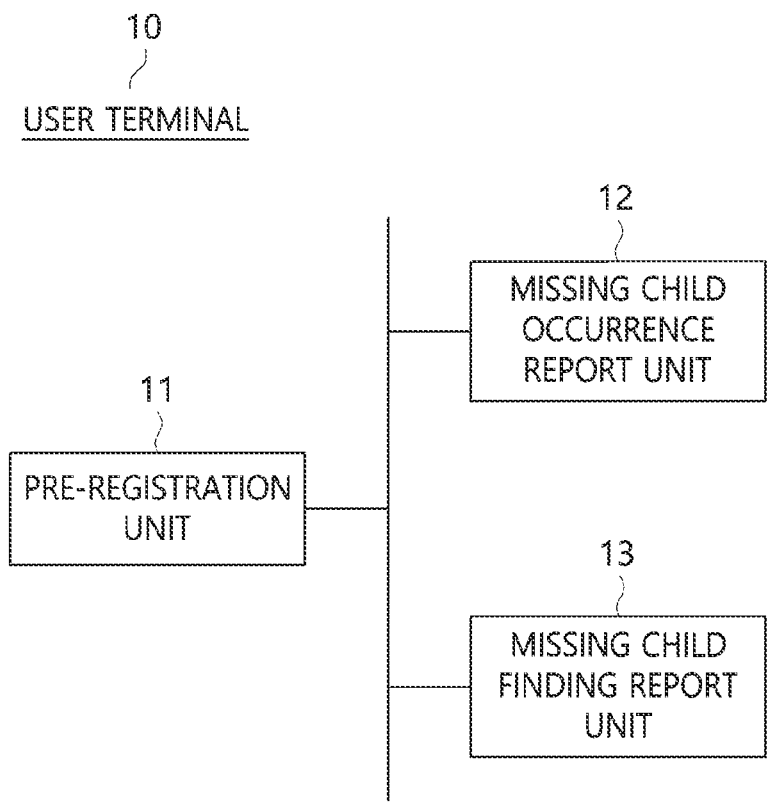
FIG. 2 is a schematic block configuration diagram of a user terminal according to an embodiment of the present invention.
Figure 3:
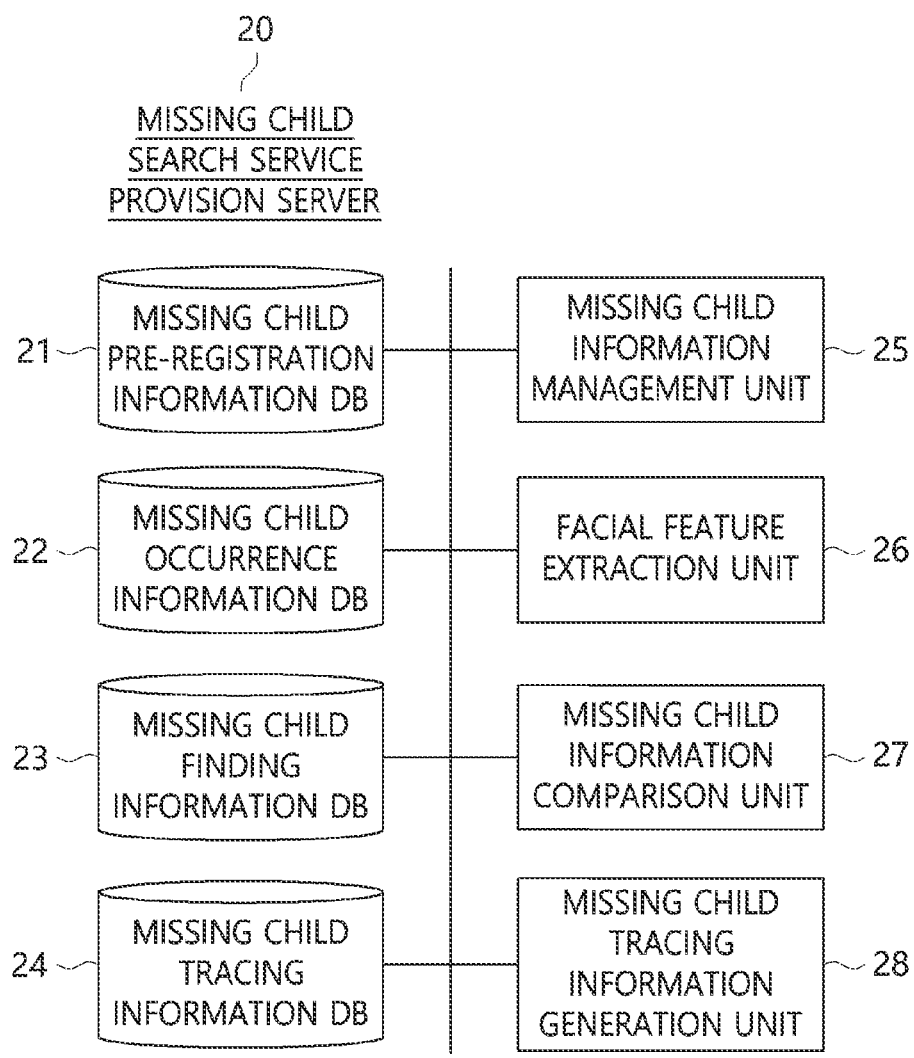
FIG. 3 is a schematic block configuration diagram of a missing child search service provision server according to an embodiment of the present invention.
Figure 4:
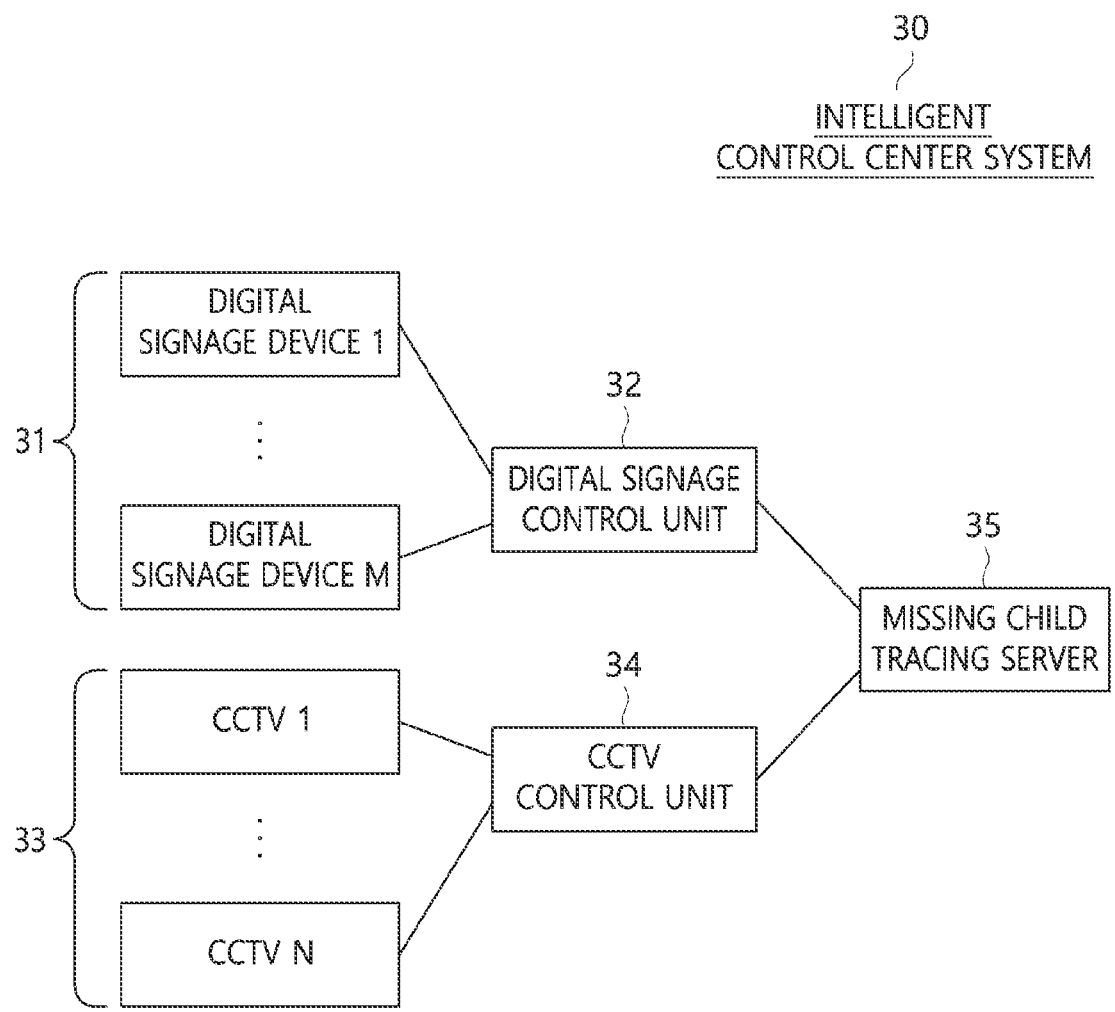
FIG. 4 is a schematic block configuration diagram of an intelligent control center system according to an embodiment of the present invention.

FIG. 1 is a configuration diagram of a system for providing a missing child search service based on deep learning according to an embodiment of the present invention, FIG. 2 is a schematic block configuration diagram of a user terminal according to an embodiment of the present invention, FIG. 3 is a schematic block configuration diagram of a missing child search service provision server according to an embodiment of the present invention, and FIG. 4 is a schematic block configuration diagram of an intelligent control center system according to an embodiment of the present invention.

Referring to FIG. 1, a system 1 for providing a missing child search service based on face recognition using deep learning according to an embodiment may be configured such that multiple user terminals 10-1, 10-2, . . . , 10-N, a missing child search service provision server 20, and an intelligent control center system 30 are operated in conjunction with each other over a wired/wireless communication network 40.

Here, the multiple user terminals 10-1, 10-2 . . . . , 10-N may generally be devices that can be used with the devices held by a user, for example, a mobile phone, a smartphone, and a smart pad, and computers that can transmit pictures, wherein a description will be made on the assumption that the user terminals are terminals implemented as smartphones in the present embodiment.

Referring to FIG. 2, in each of the multiple user terminals 10-1, 10-2, . . . , 10-N, a missing child search service provision application may be installed. When such a missing child search service provision application is executed, the corresponding user terminal may be connected to the missing child search service provision server 20, and may then be provided with a missing child search service therefrom.

The missing child search service provision application may include a pre-registration unit 11 for pre-registering a child image, which is input before a child goes missing, with the missing child search service provision server 20, a missing child report unit 12 for, when a child goes missing, transmitting missing child occurrence information to the missing child search service provision server 20, and a missing child finding report unit 13 for, when a child presumed to be the missing child is found, transmitting missing child finding information to the missing child search service provision server 20. The detailed operation of the missing child search service provision application executed on each of the multiple user terminals 10-1, 10-2 . . . 10-N will be described later with reference to FIG. 5.

In accordance with an embodiment, the missing child search service provision server 20 may perform a missing child search based on a face recognition algorithm using deep learning for missing child images received from the multiple user terminals 10-1, 10-2, . . . , 10-N so as to provide the missing child search service.

For this, the missing child search service provision server 20 may include a missing child pre-registration information database (DB) 21 for storing missing child images and additional information, which were registered before the corresponding child went missing, a missing child occurrence information DB 22 for storing a first missing child image related to the occurrence of the missing child and information about the location from which and the time at which the child went missing, a missing child finding information DB 23 for storing a second missing child image related to finding of the missing child and information about the location and time at which the missing child was found, a missing child information management unit 25 for storing, deleting, and managing pre-registered information, missing child occurrence information, and missing child finding information, a facial feature extraction unit 26 for extracting facial features from each image based on deep learning, and a missing child information comparison unit 27 for determining whether images match each other based on similarity between pieces of facial feature information. Here, the facial feature extraction unit 26 may use a robust deep-learning-technology-based face recognition model even if various capture conditions, specifically a posture, a distance, lighting, and a facial expression, are changed. The detailed operation of the missing child search service will be described later with reference to FIGS. 5 and 6.

Also, in accordance with an embodiment, the missing child search service provision server 20 may request the intelligent control center system 30 to trace a missing child.

For this operation, the missing child search service provision server 20 may include a missing child tracing information DB 24 and a missing child tracing information generation unit 28, wherein, according to an embodiment, the missing child tracing information generation unit 28 may generate missing child tracing information based on missing child occurrence information and missing child finding information.

Referring to FIG. 4, the intelligent control center system 30 may include multiple digital signage devices 31, a digital signage control unit 32, multiple Closed Circuit Televisions (CCTVs) 33, a CCTV control unit 34, and a missing child tracing server 35.

The missing child tracing server 35 analyzes multiple CCTV images acquired based on location and time information included in the missing child tracing information transferred from the missing child search service provision server 20 and then traces the missing child or the movement path of the missing child.

In accordance with an embodiment, the missing child tracing server 35 may trace a first movement path by comparatively analyzing the CCTV images, collected based on the information about the location from which and the time at which the child went missing, and a missing child image.

Further, the missing child tracing server 35 may determine whether there is a getaway car associated with kidnapping of a missing child by analyzing CCTV images, obtained by capturing the first movement path, and may then trace a second movement path by comparatively analyzing the CCTV images, collected based on the first movement path, and an image of the getaway car if it is determined that there is the getaway car.

That is, when a missing child is kidnapped rather than merely losing his or her way, a kidnapper generally flees with the missing child in a car, and thus, as described above, if the missing child is traced using only the missing child image, it is impossible to trace the movement path of the missing child after the child gets into the car. Therefore, in accordance with an embodiment, a car image present along the first movement path is analyzed, so that, when a car suspected to be a getaway car is found, the second movement path, which is the path along which the corresponding car is moving, is traced.

Here, the multiple digital signage devices 31 are outdoor billboards, realized using a digital information display (DID), and may be signboards on which advertising content can be controlled by the control center over a communication network. Such multiple digital signage devices 31 are installed in places having high amounts of pedestrian and moving traffic, such as a subway station building, a bus station, an apartment elevator, and a bank. Therefore, the missing child tracing server 35 enables information about the missing child being traced to be displayed on the digital signage devices 31, thus allowing the missing child to be promptly found by citizens. The detailed operation of the missing child tracing service will be described in detail later with reference to FIGS. 7 to 10.

Figure 5:
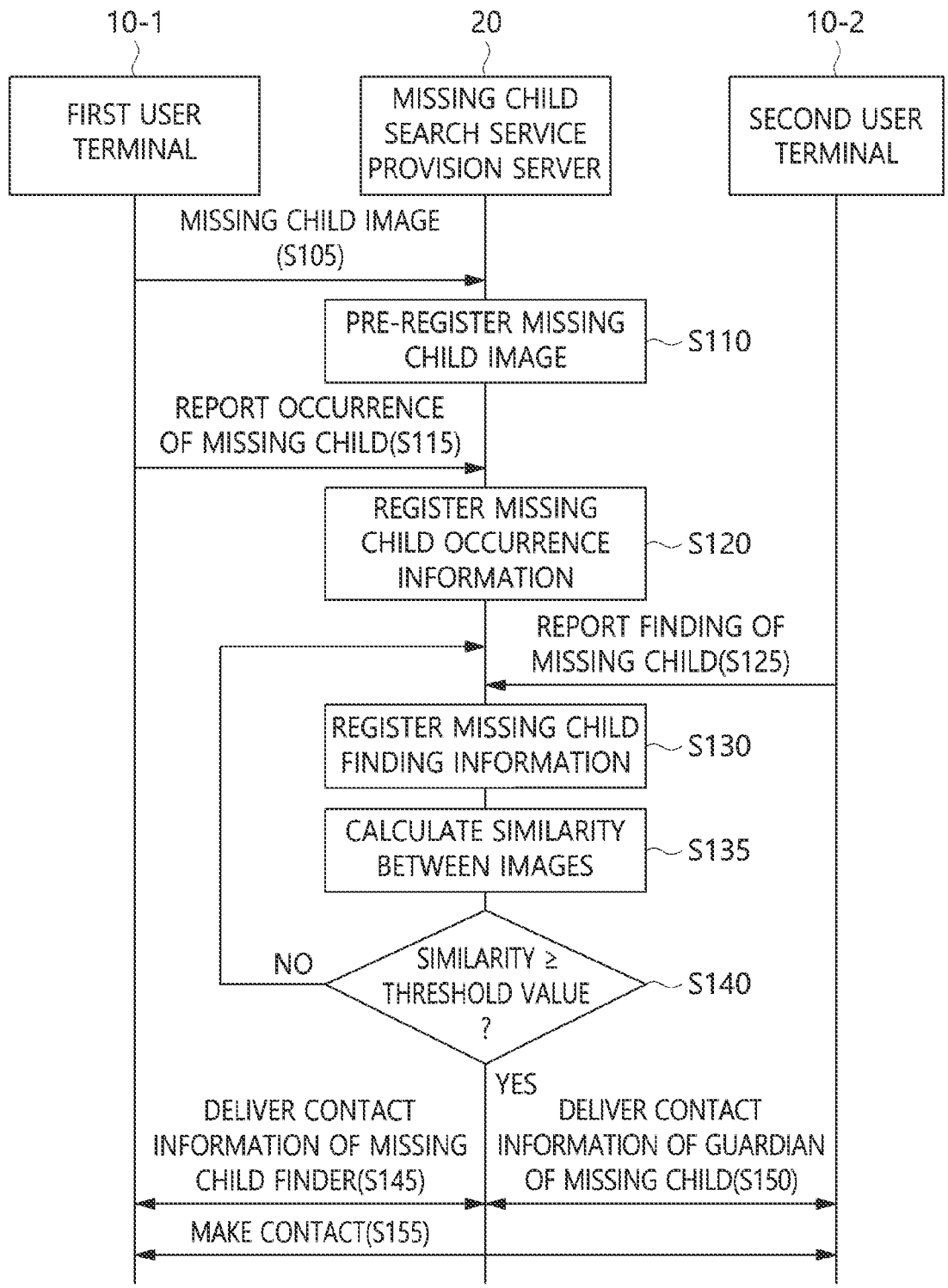
FIG. 5 is a signal flowchart illustrating a method for providing a missing child search service based on face recognition using deep learning according to an embodiment of the present invention.

FIG. 5 is a signal flowchart illustrating a method for providing a missing child search service based on face recognition using deep learning according to an embodiment.

In FIG. 5, the first user terminal 10-1 is defined as being possessed by the guardian of the missing child, and the second user terminal 10-2 is defined as being possessed by the citizen who found the missing child.

First, at least one first user terminal 10-1 may request the missing child search service provision server 20 to pre-register an image of a child before the child goes missing by transmitting the child image to the missing child search service provision server 20 at step S105.

For example, when the guardian goes out with a child to a public place, such as a shopping center or an amusement park full of people, the image of the child is pre-registered with the missing child search service provision server 20 to prepare for the occurrence of a possible incident such as the child going missing, thus enabling a prompt response to the incident when the child actually goes missing. Further, there is an advantage in that a picture of the child on the day on which the child goes missing can be registered, thereby increasing the likelihood of the missing child being found.

Then, the missing child search service provision server 20 registers the child image, transmitted from the first user terminal 10-1, with the child image mapped to the contact information of the first user terminal 10-1 at step S110.

Meanwhile, when the occurrence of a missing child is reported by at least one first user terminal 10-1 at step S115, the missing child search service provision server 20 registers missing child occurrence information including a first missing child image and information about the location from which and the time at which the child went missing at step S120.

Here, the child image pre-registered at step S110 may be registered as the first missing child image.

Also, a new image registered in real time by the first user terminal 10-1 may be registered as the first missing child image. That is, when a child goes missing without an image first being pre-registered, the guardian may report the occurrence of the missing child while transmitting an image of the child, pre-stored in the first user terminal 10-1. That is, the above-described steps S105 and S110 may not be performed before step S115 is performed.

Here, as the child image and the first missing child image, only an image in which the size of a face area is equal to or greater than a predetermined size may be registered. For example, in order to improve the accuracy of face recognition, only an image in which the size of the face area is equal to or greater than a 150 pixel*150 pixel size may be registered.

In this case, the missing child search service provision server 20 may extract facial feature information from the child image or the first missing child image based on deep learning, may encrypt the extracted facial feature information, and may store the encrypted facial feature information.

Here, the facial feature information may be extracted using a robust deep-learning-technology-based face recognition model even if various capture conditions, such as a posture, a distance, lighting, and a facial expression, are changed, and a detailed description thereof will be made later with reference to FIG. 6.

Here, the missing child search service provision server 20 may determine whether registered child images are redundant with each other based on the facial feature information, and may prevent redundant child images from being stored.

Here, when an image having facial feature information, having similarity to the facial feature information extracted from the child image or the first missing child image equal to or greater than a predetermined threshold value, is present among the pre-stored images, it may be determined that the images are redundant with each other.

Meanwhile, when a particular child is not reported missing within a predetermined period of time, the pre-registered child image may be deleted. For example, when a child is not reported missing within a predetermined time (e.g., 24 hours) after pre-registration of the image of the child, the corresponding child image may be automatically deleted.

Also, even if the child is reported missing, once the missing child is found, the child image or the first missing child image may be deleted.

That is, when the child image remains in a registered state even if a child does not go missing or if the missing child is found after pre-registration of the child image, there may be the concern of leakage of personal information. It is also inconvenient for a user to personally delete registered information due to the concern of leakage of personal information. Therefore, in an embodiment, the missing child search service provision server 20 may automatically delete the pre-registered child images, thus alleviating the user's psychological burden on the leakage of personal information.

Further, a missing child may be promptly found by reducing the number of repetitions of steps S135 and S140 to be subsequently performed through deletion of the first missing child image.

Meanwhile, although not illustrated in the drawings, in accordance with an embodiment, missing child occurrence information may be provided to citizens by sending text messages, through a missing child search service application, or via digital signage devices, thus enabling a missing child to be promptly found by citizens.

Meanwhile, when a citizen finds a nearby child who seems to be lost, he or she can report finding a lost child to the missing child search service server 20 by taking a picture of the corresponding child using his or her own second user terminal 10-2 at step S125.

Here, registration of a missing child may be performed even if the application is not necessarily used. For example, registration of a missing child may be performed such that, when missing child occurrence information is transmitted to the phone number of a police station through the second user terminal 10-2, it is automatically delivered to the missing child search service server 20.

Then, the service provision server 20 registers missing child finding information including a second missing child image and missing child finding information including information about the location and time at which the missing child was found at step S130.

Here, it may be preferable to register, as the second missing child image, an image in which the size of a face area is equal to or greater than a predetermined size. However, because photography may not be easy depending on the situation in which the missing child is found, it may not be essential.

In this case, the missing child search service provision server 20 may extract facial feature information from the second missing child image based on deep learning, and may store the extracted facial feature information. In this case, the facial feature information may be extracted using a robust deep-learning-technology-based face recognition model even if various capture conditions, such as a posture, a distance, lighting, and a facial expression, are changed, and a detailed description thereof will be made later with reference to FIG. 6.

Therefore, the missing child search service provision server 20 calculates similarity between the pieces of facial feature information respectively extracted from the first missing child image and the second missing child image based on deep learning at step S135.

Thereafter, the missing child search service provision server 20 determines whether the calculated similarity is equal to or greater than a predetermined threshold value at step S140.

For example, the probability is almost zero that, as a result of analysis of pieces of facial feature information from 6.2 million images, a similarity of 0.7 or more will appear when similarities to persons other than identical twins are analyzed. Therefore, when the similarity is equal to or greater than a predetermined threshold value, it may be determined that the first missing child image and the second missing child image are images of the same child.

Here, the number of first missing child images may be plural, and steps S135 and S140 may be repeatedly performed on each of a plurality of first missing child images.

If it is determined at step S140 that the similarity is equal to or greater than the predetermined threshold value, the missing child search service provision server 20 delivers the contact information of the second user terminal 10-2 and the missing child finding information to the first user terminal 10-1 at step S145, and may deliver contact information of the first user terminal 10-1 and the missing child occurrence information to the second user terminal 10-2 at step S150.

Then, the guardian and the citizen may make contact with each other through the first user terminal 10-1 and the second user terminal 10-2 at step S155, thus alleviating psychological distress through communication with the missing child's family and allowing the missing child to be promptly reunited with his or her family.

Figure 6:
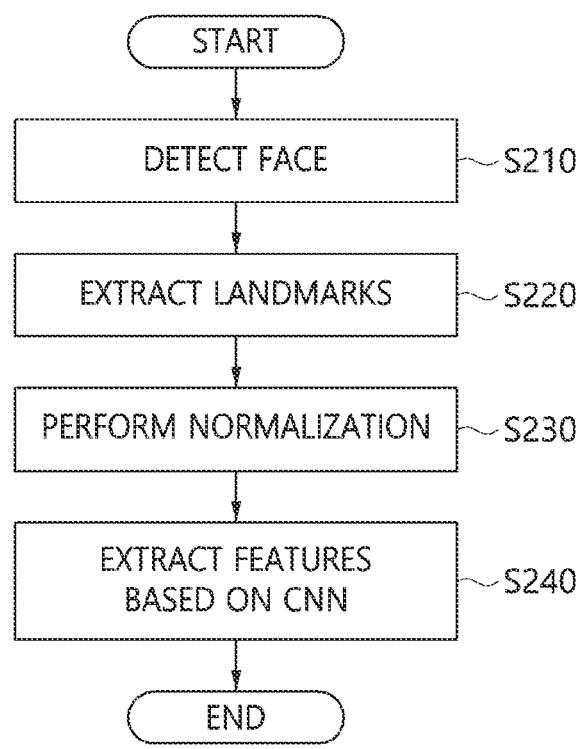
FIG. 6 is a flowchart illustrating a process of extracting facial feature information according to an embodiment of the present invention.

FIG. 6 is a flowchart illustrating a process of extracting facial feature information according to an embodiment.

Referring to FIG. 6, the missing child search service provision server 20 detects a face area from an image at step S210.

Next, the missing child search service provision server 20 detects feature points of the face from the detected face area using a three-dimensional (3D) model estimation scheme at step S220. That is, principal parts of the face, such as the eyes, nose, mouth, and eyebrows, that is, feature points serving as landmarks, are detected.

The missing child search service provision server 20 normalizes the face area based on the detected feature points at step S230. That is, the extracted face area may be a profile rather than a front view depending on the posture of the user capturing the image or the subject to be captured, and may vary with a change in facial expression, the size of the face area may also vary depending on the distance between the image-capturing user and the subject to be captured, and the brightness or the like of an image may vary depending on the lighting status at the time the image is captured. In this case, even in images captured from the same person, feature information to be extracted at step S240 may vary.

Therefore, respective extracted face areas must be normalized so as to realize robustness regardless of capture posture or distance. For example, images of the face areas may be corrected such that all of the extracted face areas face forwards based on the extracted locations of both eyes, may be corrected such that the face areas have the same facial expression based on the extracted locations of the eyes, nose, and mouth, and may be corrected such that the sizes of each of the eyes, nose, and mouth are identical based on the extracted interocular distance, and the brightness of the face area may be corrected to a preset value.

Thereafter, the missing child search service provision server 20 may calculate a feature vector from the normalized face area based on a Convolutional Neural Network (CNN) at step S250.

Figure 7:
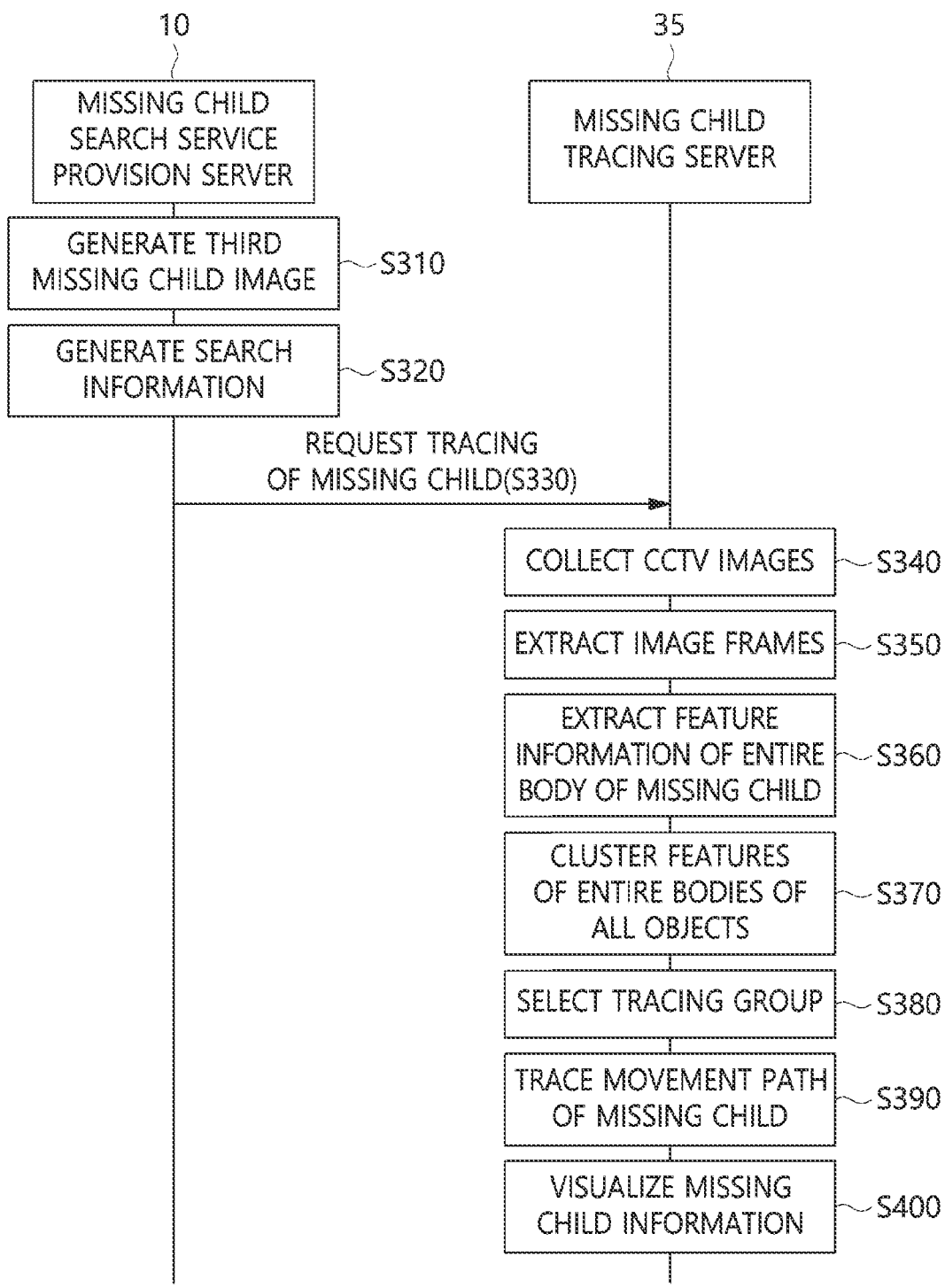
FIG. 7 is a signal flowchart illustrating a process of tracing a missing child in conjunction with an intelligent control system according to an embodiment of the present invention.

FIG. 7 is a signal flowchart illustrating a process of tracing a missing child in conjunction with an intelligent control system according to an embodiment of the present invention.

Referring to FIG. 7, the missing child search service provision server 20 generates a third missing child image corrected based on a first missing child image and a second missing child image at step S310. That is, the missing child search service provision server 20 may generate an extended image based on at least one of the first missing child image and the second missing child image, that is, may generate a third image in which an image region is maximized by reconstructing a hidden portion using at least one of the two images.

Next, the missing child search service provision server 20 generates search information by aggregating the location from which and the time at which the child went missing and the location and time at which the missing child was found at step S320.

Then, the missing child tracing server 35 may perform a missing child tracing operation, which will be described later, based on the third image and the search information.

However, in order to promptly trace the missing child, the missing child search service provision server 30 may request tracing of a missing child using only the missing child occurrence information before the missing child finding information is registered. In this case, instead of the third image, the first image may be transmitted, and the location from which and the time at which the child went missing, which is included in the missing child occurrence information, may be transmitted as the search information.

The missing child search service provision server 20 requests the missing child tracing server 35 of the intelligent control center system 30 to trace the missing child by transmitting the third missing child image and the search information to the missing child tracing server 35 at step S330.

Then, based on information about the corrected missing child tracing location and time, the missing child tracing server 35 collects CCTV images captured at the corrected location and the corrected time at step S340.

The missing child tracing server 35 extracts image frames, each including at least one person, from the collected CCTV images at step S350.

The missing child tracing server 35 extracts feature information of the entire body of the missing child from an image frame presumed to include the missing child, among the image frames, based on the third missing child image at step S360.

In detail, the missing child tracing server 35 secures facial feature information of all persons included in the extracted image frames, and thereafter secures an image frame including the missing child by analyzing similarity to the facial feature information extracted from the third missing child image. Thereafter, the missing child tracing server 35 extracts an image of the entire body of the missing child from the secured image frame, and thereafter extracts feature information of the entire body of the missing child. The process of extracting such feature information is described above with reference to FIG. 6.

Next, the missing child tracing server 35 extracts feature information of the entire bodies of all persons included in the image frames, and clusters the image frames into a predetermined number of groups based on the extracted feature information at step S370. In this case, clustering may be performed based on a pre-trained artificial intelligence cluster classification model.

The missing child tracing server 35 selects a tracing group from among the predetermined number of groups based on similarity to the feature information of the entire body of the missing child at step S380. That is, image frame groups, having similarity to the feature information of the entire body of the missing child equal to or greater than a predetermined threshold value, may be selected.

Thereafter, the missing child tracing server 35 traces the movement path of the missing child based on the time and location information of the image frames included in the tracing group at step S390. The movement path of the missing child may be displayed on a map.

Furthermore, the missing child tracing server 35 displays the missing child occurrence information on the digital signage devices 31 located along the movement path of the missing child at step S400.

Meanwhile, although not illustrated in the drawings, the missing child tracing server 35 may automatically recognize a person having the same movement path as the missing child to be a kidnapper, among movement paths of persons belonging to other image frame groups.

Therefore, the missing child tracing server 35 may display information about the person presumed to be a kidnapper together with the missing child occurrence information.

Figure 8:
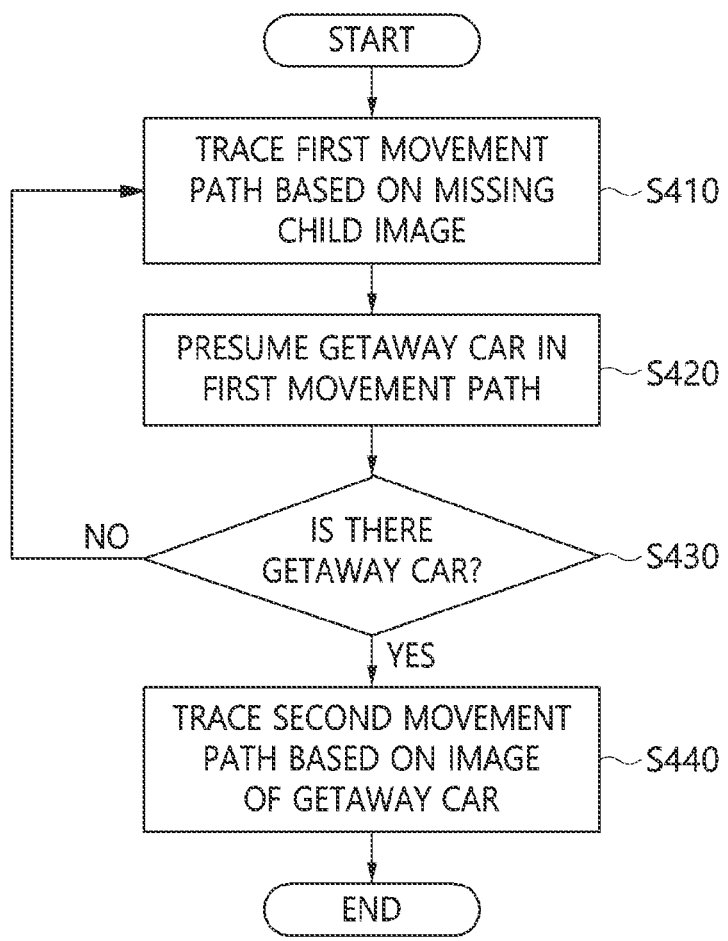
FIG. 8 is a flowchart illustrating a method for tracing the movement path of a missing child based on deep learning according to an embodiment of the present invention.

FIG. 8 is a flowchart illustrating a method for tracing the movement path of a missing child based on deep learning according to an embodiment of the present invention.

Referring to FIG. 8, the missing child tracing server 35 may trace a first movement path by comparatively analyzing CCTV images, collected based on information about the location from which and the time at which a child went missing, and a missing child image at step S410.

Here, the first movement path may be the walking path of the missing child, which is traced based on an image of the missing child, which is based on the location and time information included in missing child tracing information transferred from the missing child search service provision server 20.

However, when a missing child is kidnapped rather than merely losing high or her way, a kidnapper generally flees with the missing child in a car, and thus, as described above, when the missing child is traced using only the missing child image, it is impossible to trace the movement path of the missing child after the child got into the car.

Therefore, the missing child tracing server 35 analyzes CCTV images obtained by capturing the first movement path, and presumes whether there is a getaway car associated with kidnapping of the missing child at step S420.

Here, the presumption of the getaway car may be performed using a scheme in which a missing child tracing manager monitors the first movement path with the naked eyes and captures an image showing the situation in which the child presumed to be a missing child gets into the car. In this case, the missing child tracing server 35 may receive information about the location and the time at which the image frame in which the child gets into the car was acquired from the missing child manager, and may acquire an image of the getaway car from the corresponding image frame.

Further, the missing child tracing server 35 may presume that a car included in the image frame corresponding to the point at which the first movement path is not traced any further, that is, the time and location at which the first movement path terminates, is the getaway car.

However, this is only an example, and presumption of a getaway car according to an embodiment of the present invention may be performed using any of various schemes.

Next, when there is no car presumed to be a getaway car at step S430, the missing child tracing server 35 proceeds to step S410 of continuing to trace the first movement path.

On the other hand, when there is a car presumed to be a getaway car at step S430, the missing child tracing server 35 may trace a second movement path through comparative analysis of CCTV images, collected based on the first movement path, and the image of the getaway car at step S440.

Here, the second movement path may be the movement path of the car that the missing child got into, and which is traced based on the car image.

Figure 9:
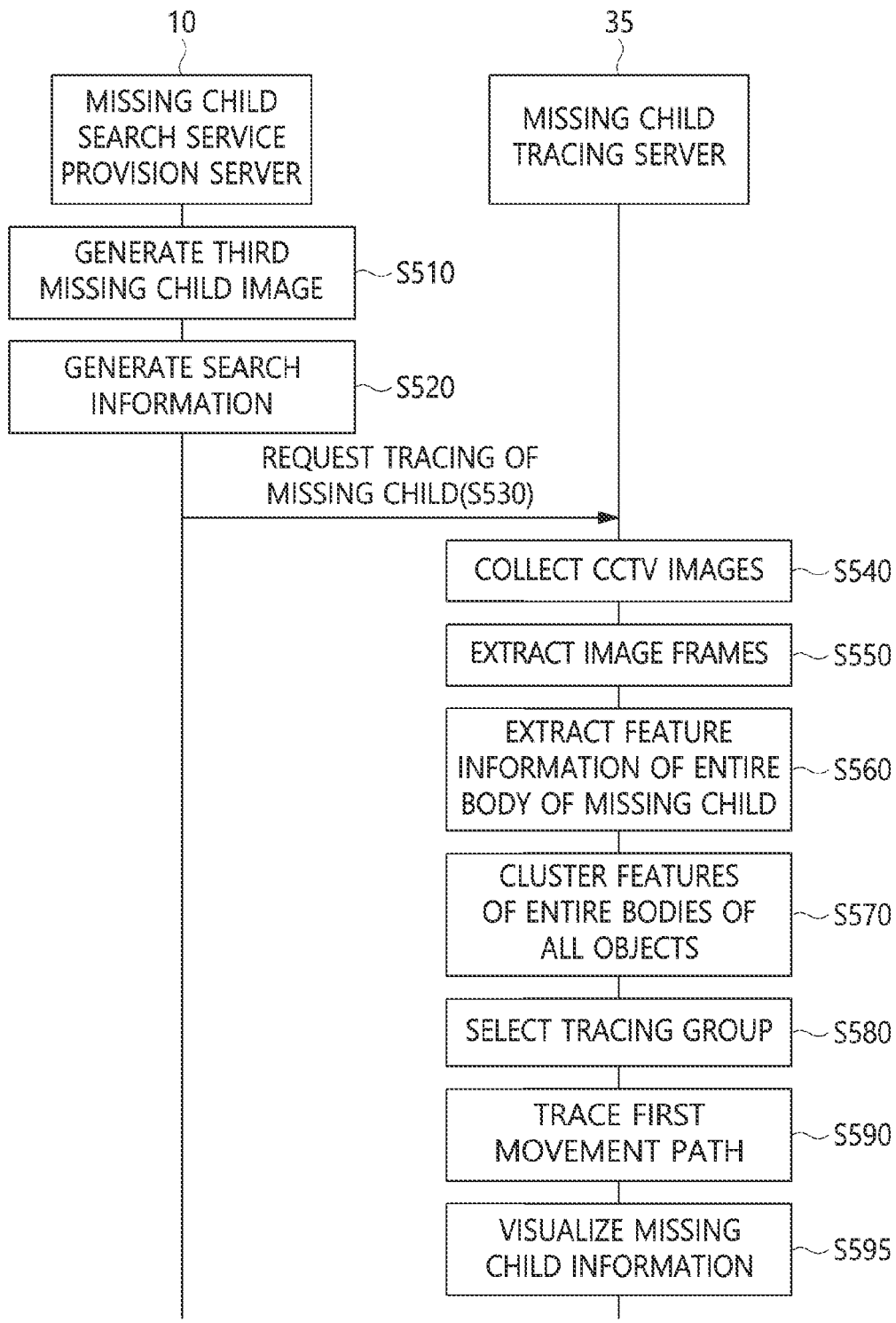
FIG. 9 is a flowchart illustrating step S310 of tracing a first movement path in FIG. 8.

FIG. 9 is a flowchart illustrating step S410 of tracing the first movement path of FIG. 8.

Referring to FIG. 9, the missing child search service provision server 20 generates a third missing child image corrected based on a first missing child image and a second missing child image at step S510. That is, the missing child search service provision server 20 may generate an extended image based on at least one of the first missing child image and the second missing child image, that is, may generate a third image in which an image region is maximized by reconstructing a hidden portion using at least one of the two images.

Next, the missing child search service provision server 20 generates search information by aggregating the location from which and the time at which the child went missing and the location and time at which the missing child was found at step S520.

Then, the missing child tracing server 35 may perform a missing child tracing operation, which will be described later, based on the third image and the search information.

However, in order to promptly trace the missing child, the missing child search service provision server 30 may request tracing of a missing child using only the missing child occurrence information before the missing child finding information is registered. In this case, instead of the third image, the first image may be transmitted, and the location from which and the time at which the child went missing, which is included in the missing child occurrence information, may be transmitted as the search information.

The missing child search service provision server 20 requests the missing child tracing server 35 of the intelligent control center system 30 to trace the missing child by transmitting the third missing child image and the search information to the missing child tracing server 35 at step S530.

Then, based on information about the corrected missing child tracing location and time, the missing child tracing server 35 collects CCTV images captured at the corrected location and the corrected time at step S540.

The missing child tracing server 35 extracts image frames, each including at least one person, from the collected CCTV images at step S550.

The missing child tracing server 35 extracts feature information of the entire body of the missing child from an image frame presumed to include the missing child, among the image frames, based on the third missing child image at step S560.

In detail, the missing child tracing server 35 secures facial feature information of all persons included in the extracted image frames, and thereafter secures an image frame including the missing child by analyzing similarity to the facial feature information extracted from the third missing child image. Thereafter, the missing child tracing server 35 extracts an image of the entire body of the missing child from the secured image frame, and thereafter extracts feature information of the entire body of the missing child. The process of extracting such feature information is described above with reference to FIG. 6.

Next, the missing child tracing server 35 extracts feature information of the entire bodies of all persons included in the image frames, and clusters the image frames into a predetermined number of groups based on the extracted feature information at step S570. In this case, clustering may be performed based on a pre-trained artificial intelligence cluster classification model.

The missing child tracing server 35 selects a tracing group from among the predetermined number of groups based on similarity to the feature information of the entire body of the missing child at step S580. That is, image frame groups, having similarity to the feature information of the entire body of the missing child equal to or greater than a predetermined threshold value, may be selected.

Thereafter, the missing child tracing server 35 traces the movement path of the missing child based on the time and location information of the image frames included in the tracing group at step S590. The movement path of the missing child may be displayed on a map.

Furthermore, the missing child tracing server 35 displays the missing child occurrence information on the digital signage devices 31 located along the movement path of the missing child at step S595.

Meanwhile, although not illustrated in the drawings, the missing child tracing server 35 may automatically recognize a person having the same movement path as the missing child to be a kidnapper, among movement paths of persons belonging to other image frame groups.

Therefore, the missing child tracing server 35 may display information about the person presumed to be a kidnapper together with the missing child occurrence information.

Figure 10:
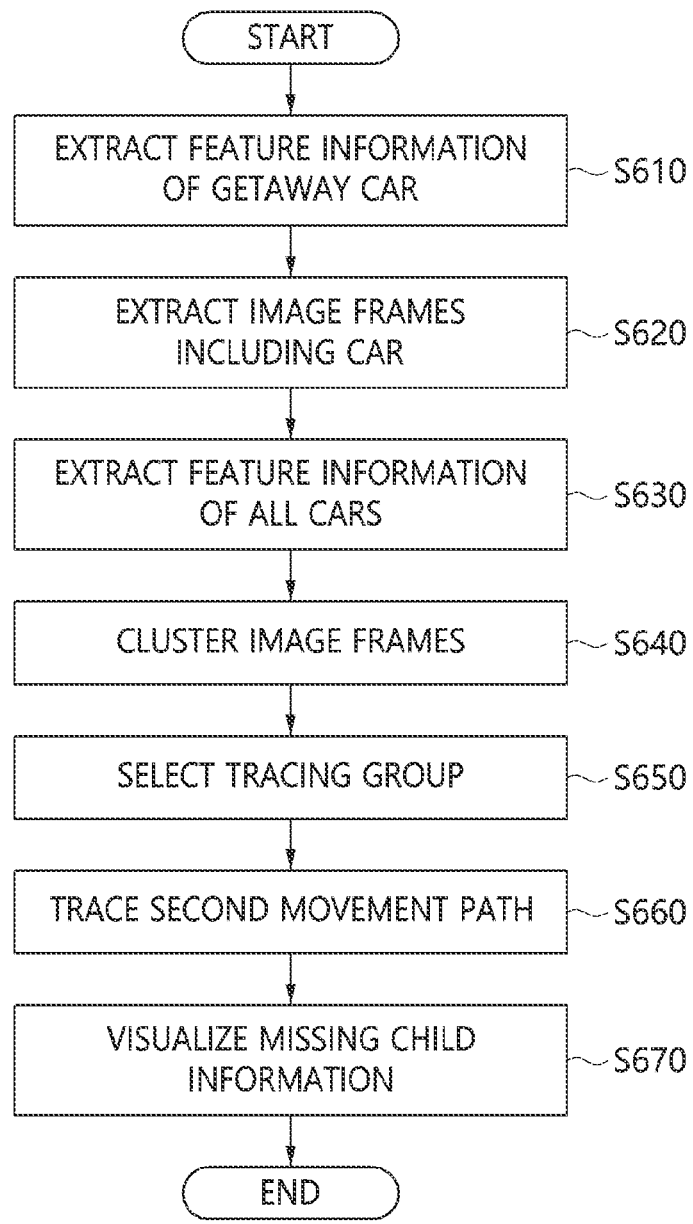
FIG. 10 is a flowchart illustrating step S340 of tracing a second movement path in FIG. 8.

FIG. 10 is a flowchart illustrating step S440 of tracing the second movement path of FIG. 8.

Referring to FIG. 10, the missing child tracing server 35 extracts feature information of the entire getaway car from the image of the getaway car at step S610. The process of extracting such feature information is the same as that described above with reference to FIG. 6.

Here, the getaway car image may be an image corrected based on multiple images of the getaway car captured from various angles. That is, although not illustrated in the drawing, the missing child tracing server 35 may generate an extended image based on at least one of multiple car images, that is, may generate a vehicle image in which an image region is maximized by reconstructing a hidden portion using at least one of two images.

The missing child tracing server 35 extracts image frames including at least one car from CCTV images collected based on the second movement path at step S620.

Thereafter, the missing child tracing server 35 extracts the feature information of all cars included in the extracted image frames at step S630 and clusters the image frames into a predetermined number of groups based on the extracted feature information at step S640. Here, the clustering may be performed based on a pre-trained artificial intelligence cluster classification model.

The missing child tracing server 35 selects a tracing group from among the predetermined number of groups based on similarity to the feature information of the getaway car image at step S650. That is, image frame groups, having similarity to the feature information of the getaway car image equal to or greater than a predetermined threshold value, may be selected.

Thereafter, the missing child tracing server 35 traces the second movement path, along which the car moves, based on the time and location information of the image frames included in the tracing group at step S660. This second movement path may be marked on a map.

Further, the missing child tracing server 35 displays missing child occurrence information on the digital signage devices 31 located along the second movement path at step S670.

Figure 11:
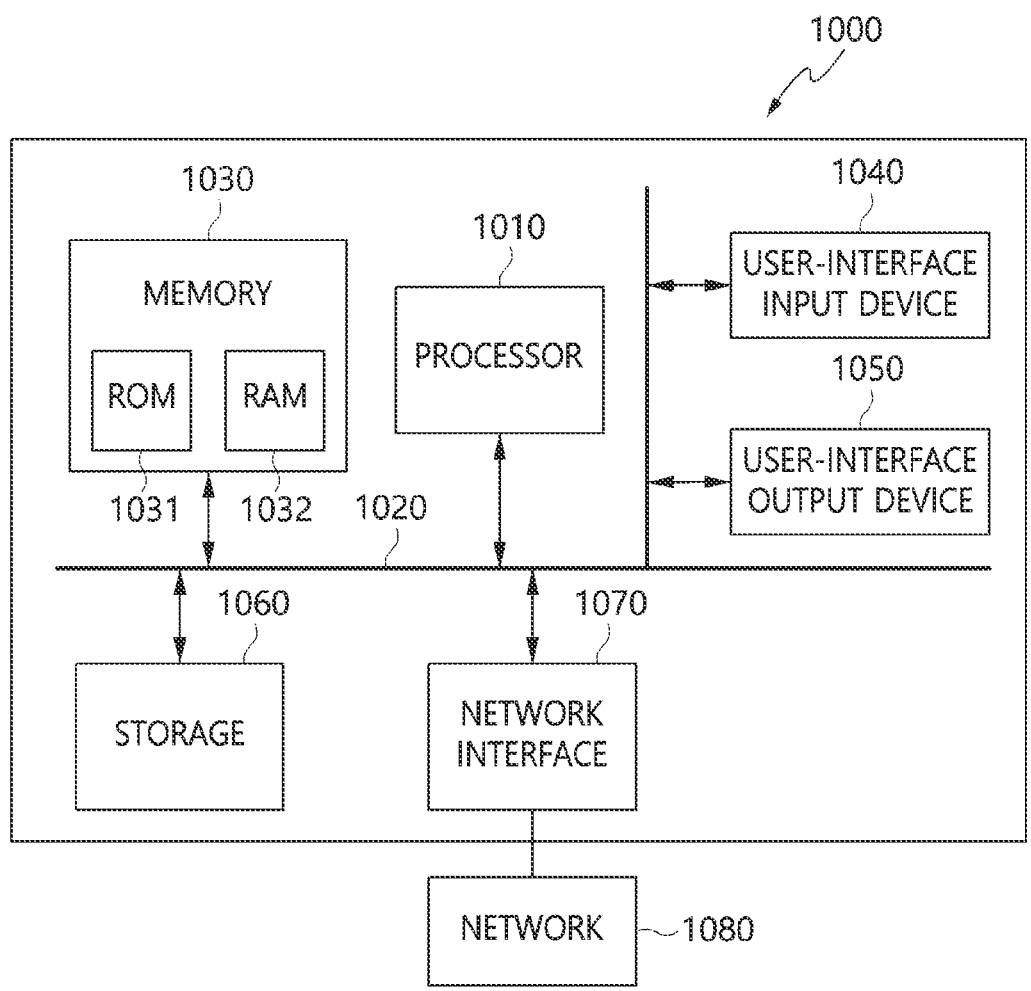
FIG. 11 is a diagram illustrating the configuration of a computer system according to an embodiment of the present invention.

FIG. 11 is a diagram illustrating the configuration of a computer system according to an embodiment.

Each of a user terminal 10, a missing child search service provision apparatus 20, and a missing child tracing server 35 according to embodiments may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium. For example, the memory 1030 may include Read-Only Memory (ROM) 1031 or Random Access Memory (RAM) 1032.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

The invention claimed is:

1. A method for providing a missing child search service based on face recognition using deep learning, the method comprising:
registering missing child occurrence information including a first missing child image and information about a location from which and a time at which a child went missing when occurrence of a missing child is reported by at least one first user terminal;
registering missing child finding information including a second missing child image and information about a location and a time at which a missing child was found when finding of the missing child is reported by at least one second user terminal;
calculating a similarity between pieces of facial feature information extracted from the first missing child image and the second missing child image, respectively, based on deep learning; and
when the similarity is equal to or greater than a predetermined threshold value, delivering contact information of the second user terminal and the missing child finding information to the first user terminal, and delivering contact information of the first user terminal and the missing child occurrence information to the second user terminal,
wherein the facial feature information is acquired by:
detecting a face area from each of the first missing child image and the second missing child image;
detecting feature points of a face from the detected face area through a three- dimensional (3D) model estimation scheme;
normalizing the face area based on the detected feature points; and
calculating a feature vector based on a convolutional neural network from the normalized face area.

2. The method of claim 1, further comprising:
receiving a child image from the at least one first user terminal and pre-registering the child image before the child goes missing,
wherein registering the missing child occurrence information is configured to, when occurrence of the missing child is reported by the first user terminal, register the pre-registered child image as the first missing child image.

3. The method of claim 1, further comprising:
receiving a child image from the first user terminal and pre-registering the child image before the child goes missing; and
when occurrence of a missing child is not reported within a predetermined period of time after pre-registration of the child image, deleting the pre-registered child image.

4. The method of claim 3, wherein each of the child image and the first missing child image is configured such that only an image in which a size of a face area is equal to or greater than a predetermined size is registered.

5. The method of claim 1, further comprising:
requesting an intelligent control center system to trace the missing child by transmitting the missing child occurrence information to the intelligent control center system,
wherein the intelligent control center system comprises a missing child tracing server for operating in conjunction with multiple Closed Circuit Televisions (CCTVs) and signage displays,
wherein the missing child tracing server performs:
collecting CCTV images based on the information about the location from which and the time at which the child went missing;
extracting image frames, each including at least one person, from the collected CCTV images;
extracting feature information of an entire body of the missing child from an image frame presumed to include the missing child from among the image frames based on the first missing child image;
extracting feature information of entire bodies of all persons included in the image frames and clustering the image frames into a predetermined number of groups based on the extracted feature information;
selecting a tracing group from among the predetermined number of groups based on a similarity to the feature information of the entire body of the missing child;
tracing a movement path of the missing child based on time and location information of image frames included in the tracing group; and
displaying the missing child occurrence information on digital signage devices located along the movement path of the missing child.

6. The method of claim 1, further comprising:
generating a third missing child image that is corrected based on the first missing child image and the second missing child image;
generating search information by aggregating the location from which and the time at which the child went missing and the location and the time at which the missing child was found; and
requesting an intelligent control center system to trace the missing child by transmitting the third missing child image and the search information to the intelligent control center system,
wherein the intelligent control center system comprises a missing child tracing server for operating in conjunction with multiple Closed Circuit Televisions (CCTVs) and signage displays,
wherein the missing child tracing server performs:
collecting CCTV images based on the search information;
extracting image frames, each including at least one person, from the collected CCTV images;
extracting feature information of an entire body of the missing child from an image frame presumed to include the missing child from among the image frames based on the third missing child image;
extracting feature information of entire bodies of all persons included in the image frames and clustering the image frames into a predetermined number of groups based on the extracted feature information;

selecting a tracing group from among the predetermined number of groups based on a similarity to the feature information of the entire body of the missing child;
tracing a movement path of the missing child based on time and location information of image frames included in the tracing group; and
displaying the missing child occurrence information on digital signage devices located along the movement path of the missing child.

7. An apparatus for providing a missing child search service based on face recognition using deep learning, comprising:
a memory for storing at least one program; and
a processor for executing the program,
wherein the program performs:
registering missing child occurrence information including a first missing child image and information about a location from which and a time at which a child went missing when occurrence of a missing child is reported by at least one first user terminal;
registering missing child finding information including a second missing child image and information about a location and a time at which a missing child was found when finding of the missing child is reported by at least one second user terminal;
calculating a similarity between pieces of facial feature information extracted from the first missing child image and the second missing child image, respectively, based on deep learning; and
when the similarity is equal to or greater than a predetermined threshold value, delivering contact information of the second user terminal and the missing child finding information to the first user terminal, and delivering contact information of the first user terminal and the missing child occurrence information to the second user terminal,
wherein the program further performs:
receiving a child image from the at least one first user terminal and pre- registering the child image before the child goes missing; and
when occurrence of a missing child is not reported within a predetermined period of time after pre-registration of the child image, deleting the pre-registered child image,
wherein registering the missing child occurrence information is configured to, when occurrence of the missing child is reported by the first user terminal, register the pre-registered child image as the first missing child image.

8. The apparatus of claim 7, wherein the facial feature information is acquired by,
detecting a face area from each of the first missing child image and the second missing child image;
detecting feature points of a face from the detected face area through a three-dimensional (3D) model estimation scheme;
normalizing the face area based on the detected feature points; and
calculating a feature vector based on a convolutional neural network from the normalized face area.

9. The apparatus of claim 7, wherein the program further performs:
requesting an intelligent control center system to trace the missing child by transmitting the missing child occurrence information to the intelligent control center system,
wherein the intelligent control center system comprises a missing child tracing server for operating in conjunction with multiple Closed Circuit Televisions (CCTVs) and signage displays, and
wherein the missing child tracing server performs:
collecting CCTV images based on the information about the location from which and the time at which the child went missing;
extracting image frames, each including at least one person, from the collected CCTV images;
extracting feature information of an entire body of the missing child from an image frame presumed to include the missing child from among the image frames based on the first missing child image;
extracting feature information of entire bodies of all persons included in the image frames and clustering the image frames into a predetermined number of groups based on the extracted feature information;
selecting a tracing group from among the predetermined number of groups based on a similarity to the feature information of the entire body of the missing child;
tracing a movement path of the missing child based on time and location information of image frames included in the tracing group; and
displaying the missing child occurrence information on digital signage devices located along the movement path of the missing child.

10. The apparatus of claim 7, wherein the program further performs:
generating a third missing child image that is corrected based on the first missing child image and the second missing child image;
generating search information by aggregating the location from which and the time at which the child went missing and the location and the time at which the missing child was found; and
requesting an intelligent control center system to trace the missing child by transmitting the third missing child image and the search information to the intelligent control center system,
wherein the intelligent control center system comprises a missing child tracing server for operating in conjunction with multiple Closed Circuit Televisions (CCTVs) and signage displays, and
wherein the missing child tracing server performs:
collecting CCTV images based on the search information;
extracting image frames, each including at least one person, from the collected CCTV images;
extracting feature information of an entire body of the missing child from an image frame presumed to include the missing child from among the image frames based on the third missing child image;
extracting feature information of entire bodies of all persons included in the image frames and clustering the image frames into a predetermined number of groups based on the extracted feature information;
selecting a tracing group from among the predetermined number of groups based on a similarity to the feature information of the entire body of the missing child;
tracing a movement path of the missing child based on time and location information of image frames included in the tracing group; and
displaying the missing child occurrence information on digital signage devices located along the movement path of the missing child.

11. The apparatus of claim 7, wherein the program further performs:

tracing a first movement path through comparative analysis of CCTV images, collected based on the information about the location from which and the time at which the child went missing, and a missing child image;

analyzing CCTV images, obtained by capturing the first movement path, and then determining whether there is a getaway car associated with kidnapping of the missing child; and if it is determined that there is an image of the getaway car, tracing a second movement path through comparative analysis of the CCTV images, collected based on the first movement path, and the image of the getaway car.

12. The apparatus of claim 11, wherein tracing the second movement path comprises:

extracting feature information of an entire getaway car from an image frame of the getaway car;

extracting image frames, each including at least one car, from CCTV images collected based on the second movement path;

extracting feature information of all cars included in the image frames and clustering the image frames into a predetermined number of groups based on the extracted feature information;

selecting a tracing group from among the predetermined number of groups based on a similarity to the feature information of the getaway car; and tracing the second movement path along which the car moves based on time and location information of image frames included in the tracing group.

* * * * *